Aug. 26, 1952 H. A. AFFEL ET AL 2,608,617

TELEVISION CONVERTER SYSTEM

Filed June 14, 1950

INVENTORS: H. A. AFFEL
J. B. MAGGIO

BY Hugh S. Wertz

ATTORNEY

Patented Aug. 26, 1952 2,608,617

UNITED STATES PATENT OFFICE 2,608,617

TELEVISION CONVERTER SYSTEM

Herman A. Affel and John B. Maggio, Summit, N. J., assignors to Bell Telephone Laboratories, Incorporated, New York, N. Y., a corporation of New York Application June 14, 1950, Serial No. 168,128

2 Claims. (Cl. 178—6.8)

Figure 1:
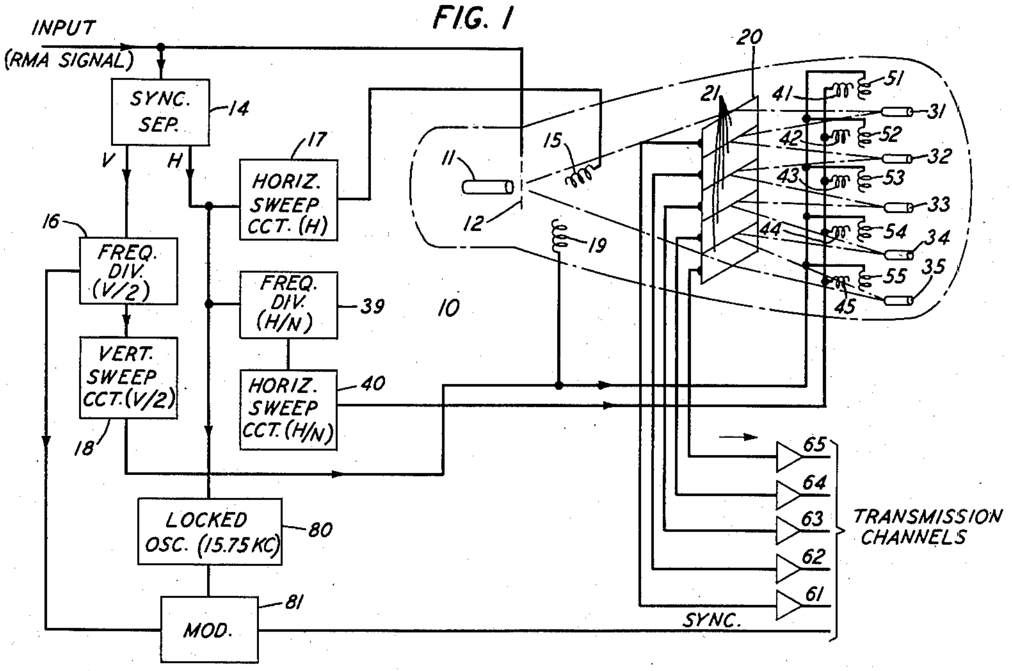

This invention relates to the transmission of television signals and more particularly to a system for multipath transmission of such signals to relax the requirements of such transmission.

In systems known in the prior art for television scanning, the object scene to be televised is projected as a whole upon a target plate, which is thereafter evaluated by a scanning cathode ray beam. The signals derived thereby are then used in various ways for the transmission of the picture information. Inherent in such techniques is the requirement that the signal transmitted be of comparatively wide band-width.

Because of the geographic limitations on the effective range of a single television station, it becomes necessary to transmit television signals from the originating station to other remote stations for broadcast to the surroundings. For transmission to these remote stations, the transmission path frequently comprises a coaxial cable.

In television circuits, both the attenuation and phase must be equalized to fairly close limits. This constitutes one of the most difficult problems in the transmission of television signals over coaxial cables. To achieve the desired corrections, it is usually necessary to add rather complex and expensive equipment at the terminals and repeaters of a broad band system of the kind required for television transmission. The complexity of this correction increases considerably with the width of the frequency band transmitted. In particular, the precision with which the delay-frequency characteristic must be adjusted increases substantially directly therewith. The problem of facilitating the correction therefore is closely identified with that of band-width reduction.

It is an object of this invention to facilitate the transmission of television signals over wire cables, and more particularly to reduce the band-width of such signals for transmission without loss of signal information.

It is known that when it is possible to divide signal information which ordinarily is transmitted over a single channel between a number of parallel channels, each channel can carry a narrow band of the frequencies in the signal information. This is utilized in the present invention which provides an improved system for multipath transmission of narrow bands of the television signals with relaxed requirements in such transmission and more particularly supplies improved techniques for the conversion and recovery of such signals. Long distance transmission of television signals with a minimum of signal degradation is thus facilitated, and even the transoceanic transmission of television signals by means of a submarine cable made feasible.

In a preferred embodiment in accordance with the invention, an important feature is the elimination of field interlacing during transmission to facilitate the conversion of the standard television signals.

These objects and features are realized by a transmission system in which: the video signals which are to be transmitted are stored on an analyzer screen which is divided into a plurality of sections; each section is simultaneously read by an independent scanning cathode ray pencil; distinct and independent signals are derived thereby simultaneously from each section; the derived signals are transmitted over separate channels at a reduced band-width to the remote stations; and there, the separate signals are recombined, for rebroadcast purposes, into a facsimile of the original signal with little loss or degradation in signal information.

In a preferred embodiment in accordance with the invention, the conventional RMA signal which is to be transmitted is deposited on an analyzer screen which comprises N horizontal sections. The signal is stored by a charging beam which is deflected horizontally across the screen at the horizontal RMA sweep rate, but vertically at one-half the vertical RMA sweep rate. This results in a vertical displacement of the two fields of a single frame and the consequent elimination of the interlace. Each section of the screen is thereafter scanned simultaneously by independent discharging or reading beams which are deflected horizontally across the screen at a recurrent rate of 1/N the RMA horizontal sweep rate and vertically at a recurrent rate ½ the RMA vertical sweep rate. The output currents derived from the various sections of the screen are individually amplified, and then transmitted over separate narrow band channels to the remote stations where the process is reversed and the separate signals recombined for broadcast. It will be noted that the advantages of the process are obtained even in the case where the separate narrow band channels are derived by carrier methods from a wide band coaxial system.

Figure 2:
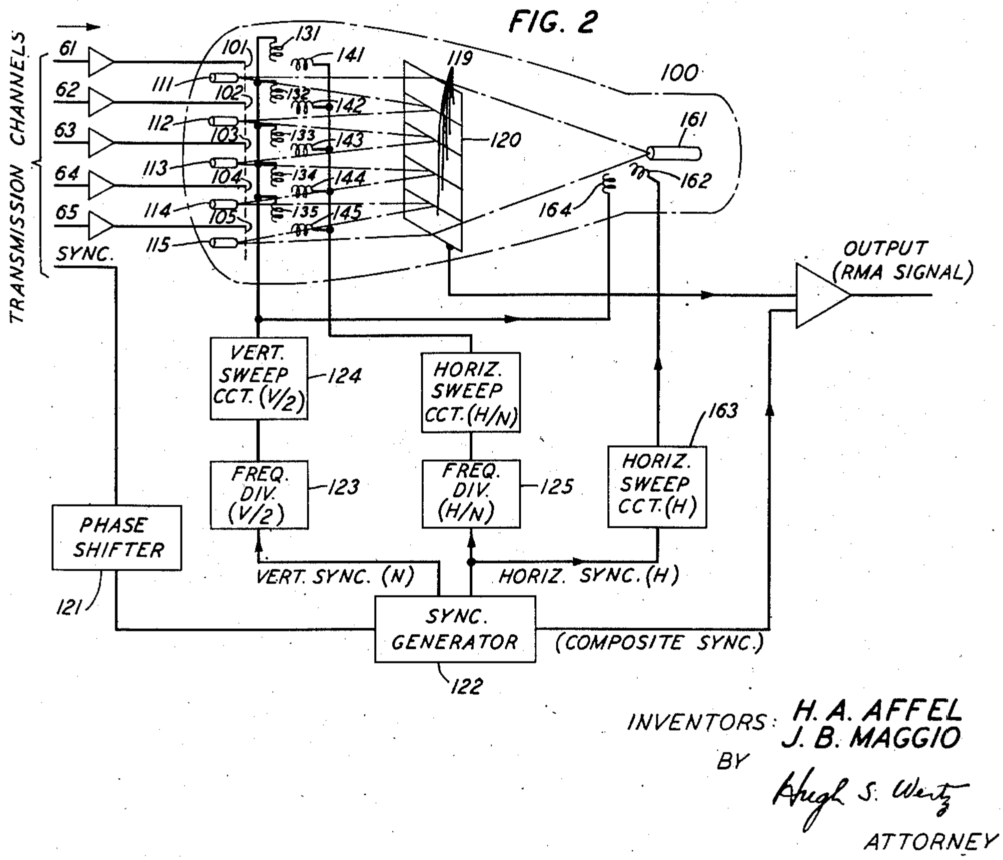

The invention will be better understood from the following more detailed description taken in connection with the accompanying drawings forming part thereof, in which:

Fig. 1 illustrates a terminal arrangement for dividing the original broad band signal into a series of narrow band signals, in accordance with the invention, for use at the transmitting station; and Fig. 2 illustrates a terminal arrangement for combining a series of narrow band signals into a replica of the original broad band signal, in accordance with the invention, for use at the receiving station from which the reformed television signals are to be broadcast.

Referring more specifically to the drawing, Fig. 1 shows, in block schematic form, an illustrative arrangement for the transmitting terminal at the originating station of a system in accordance with the invention. The television signal to be transmitted is converted from a single broad band signal to a plurality of narrow band signals. The converting arrangement 10 utilizes an analyzer screen 20 on which a charge pattern representative of the television signal information is deposited. This analyzer screen 20 is sectionalized in N horizontal strips 21, and the whole thereof is scanned by the charging beam from the electron gun 11. The value of N determines the number of channels into which the broad band signal is to be divided. It should be chosen large enough to give the necessary relaxation in the transmission path requirements but the size of N is limited by practical considerations. Here, by way of example, the value 5 is chosen for N. The intensity of this charging beam is modulated, in accordance with a method well known in the art, by applying the RMA television signal input to the control grid 12 associated with the electron gun 11. The input RMA signal is simultaneously supplied to a conventional synchronizing separator 14 which separates therefrom the horizontal and vertical, or line and field, synchronizing pulses. The horizontal or line pulses are used to trigger the horizontal sweep circuit 17 which supplies the horizontal sweep voltage to the coils 15 for deflecting the charging beam horizontally across the screen 20 at the RMA line rate H. The field synchronizing pulse, at the RMA field rate V, is supplied from the synchronizing separator 14 to a frequency dividing circuit 16 which divides to obtain a pulse of recurrence rate V/2 to drive the sweep circuit 18 which supplies the sweep voltage to the coils 19 for deflecting the charging beam vertically over the entire screen 20 at ½ the RMA field rate or at the RMA frame rate. This results in the vertical displacement of the two fields that comprise a normal RMA frame and removes the field interlacing therefrom. This feature makes feasible conversion of this sort by relaxing the requirements of registry which might otherwise be insurmountable.

The signal information which has been stored in the form of a charge pattern on the screen 20, is recovered by simultaneously scanning the N sections 21 thereof by N corresponding discharging or reading electron beams. The discharging beams scan at a 1/Nth slower rate than the charging beam which results in a proportionate saving of band-width. In Fig. 1, each separate section N of the screen 20 is scanned by the discharging beam from an associated electron gun. By way of example, for purposes of illustration, five of such guns, 31, 32, 33, 34 and 35 have been shown corresponding to the value of 5 chosen for N. The several beams are deflected vertically by means of the coils 51, 52, 53, 54 and 55 respectively. Horizontal deflection of the discharging beam occurs at 1/N the line frequency of the RMA signal, since each beam is to cover only 1/Nth of the screen area during a single frame. Therefore, the synchronizing pulses of the line rate H are supplied from the synchronizing separator 14 to the frequency dividing circuit 39 for division by the factor N, and the output thereof is used to trigger the horizontal sweep circuit 40 which produces sweep voltage waves at a recurrence rate of H/N which are applied to the various horizontal deflecting coils, 41, 42, 43, 44 and 45. Each discharging beam vertically scans at the same recurrence rate V/2 as the charging beam but only covers 1/Nth the vertical height of the screen 20. This deflection rate is obtained by supplying the corresponding vertical deflecting coils 51, 52, 53, 54 and 55 with sweep voltage waves of recurrence rate V/2. These are supplied directly from the sweep circuit 18 which also supplies the vertical sweep voltage for the charging beam of the electron gun 11. A separate and distinct signal, whose band-width is 1/Nth the band-width of the original television signal, is derived from each of the N sections by action of the discharging or reading beams thereon, and collected by an independent output circuit associated with each individual section. The signals derived are proportional to the stored charges on the corresponding elements and, as a result, to corresponding portions of the original signals. The signals from each section are individually amplified and transmitted over individual channels 61, 62, 63, 64 and 65 at a band-width reduced by the factor N. Each channel comprises a single channel of a multichannel circuit for transmission to the remote station.

It is necessary to provide that the multiple scanning beams and their associated output circuits do not mutually interfere. Moreover, the multiple beams must be properly synchronized so that the reading beams do not scan any element of the screen until after the desired charge has been deposited, and the screen must retain the charge until so scanned. The proper control of the various beams is maintained by the use of the frequency dividers. In this manner a continuous and complete change of the input broad band signal to a series of narrow band signals is feasible.

Synchronization between the transmitter and receiver is achieved in the manner well known in the art. Horizontal synchronizing information is transmitted over a separate channel by a 15.75-kilocycle sine wave which is locked in with the horizontal synchronizing pulses of the incoming signal. Oscillator 80 which produces this wave is locked both in frequency and phase with the incoming line or horizontal synchronizing information. Field or vertical synchronizing information is added to the output of oscillator 80 by amplitude modulating the sine wave thereof in the modulator 81 by a signal derived from the vertical synchronizing pulses of the input signal.

It can be seen that the transmission path between the originating station and the remote receiving station requires N channels each of approximately 1/Nth the band-width of the original RMA signal in addition to a synchronizing channel which must transmit the horizontal and vertical synchronizing information.

Fig. 2 shows, in block schematic form, an illustrative arrangement 100 at the remote station for receiving the transmitted narrow band signals and reforming them into a facsimile of the original RMA signal for broadcast for utilization by standard home receivers. The arrangement 100 at the receiving terminal is substantially the inverse or reciprocal of the arrangement 10 at the transmitting terminal of the system.

Here, each of the N narrow band signals transmitted is stored on a separate section of a similar analyzer screen by an associated charging beam, and the original RMA signal is recovered by scanning the whole surface of the screen with a single reading beam. The signals from the individual transmitting channels 61, 62, 63, 64, and 65, after the amplification by a series of associated amplifiers, are supplied to the control grids 101, 102, 103, 104, and 105 to modulate the beams from the corresponding electron guns 111, 112, 113, 114, and 115, respectively. Each beam, therefore, charges a separate section of the analyzer screen 120, which is sectionalized into N horizontal strips 119 as at the transmitting terminal. The charge stored is in proportion to the modulating signal. The deflecting system for the independent charging beams at the receiving terminal is substantially identical to that for the discharging beams of the transmitting terminal. The synchronizing signal, which is transmitted in its separate channel as hereinabove explained, is supplied through a phase shifter 121 to the synchronizing generator 122 which develops therefrom a vertical synchronizing pulse of the RMA field recurrence rate V and a horizontal synchronizing pulse of the RMA line recurrence rate H. The vertical synchronizing pulses are supplied first to the frequency divider 123 which divides by a factor of 2 and thereafter to the vertical sweep circuit 124 which provides sweep voltages at a recurrent rate V/2 to the coils 131, 132, 133, 134, and 135, respectively, for deflecting the independent charging beams vertically along their respective 1/Nths of the vertical height of the screen 120. The horizontal synchronizing pulses of recurrent rate H, the RMA line frequency, are supplied from the synchronizing generator 122 to a frequency divider 125 which divides by the factor N, the band-width reduction factor, and thereafter supplies the horizontal sweep circuit 126 which provides sweep voltages, at a recurrent rate of H/N, to the coils 141, 142, 143, 144, and 145 for deflecting the independent charging beams horizontally across their respective sections of the screen 120. After a charge pattern has been deposited on the screen 120 by the charging beams, the original RMA signal is recovered by scanning the screen 120 by a single discharging or reading beam. To this end the entire screen 120 is scanned by a reading beam of constant intensity supplied from the electron gun 16. The deflection system therefor is substantially that of the charging beam at the transmitting terminal of the system. The horizontal deflecting coils 162 are supplied with sweep voltage waves of recurrent rate H, the line rate of the RMA signal, from the sweep circuit 163 which is triggered by pulses of line frequency H from the synchronizing generator 122. The vertical deflecting coils 164 for the reading beam are supplied with sweep voltage waves of recurrent rate V/2, the RMA frame rate from the vertical sweep circuit 124.

The signal which is derived by scanning each section of the screen, in turn, by the single reading beam from the electron gun 161 then represents a broad band signal which is the composite of the N narrow band signals transmitted. This is combined with the composite synchronizing signal from the synchronizing generator 122, in the manner usual in the art, and the resultant output is a facsimile of the original RMA signal which was supplied to the transmitting terminal.

The same precautions must be taken, as pointed out hereinbefore, to avoid mutual interference between the multiple beams and to maintain the proper synchronization between the charging and discharging beams.

It is to be understood that these arrangements are merely illustrative of the invention. Numerous other arrangements can be devised by one skilled in the art without departing from the spirit and scope of the invention. For example, the analyzer screen can take a variety of forms. It can comprise a two-sided mosaic screen, of the kind well known in the storage tube art, one side of which can be used for storing an electrostatic charge proportional to a signal pattern, and the other thereof can be subsequently scanned for deriving an output therefrom proportional to the stored charge by collecting the secondary emission electrons released by the discharging beam. In such a case, the charging and discharging functions can be incorporated into a single device. Another alternative arrangement can use a fluorescent screen as an analyzer screen, and the complete television signal can in effect be recreated thereon by projection, and, in turn, an iconoscope type mechanism can be utilized as the discharging or reading element.

What is claimed is:

1. A system for multichannel transmission of television signals representing picture information and characterized by a line rate H, a field rate V, and a frame rate V/2, a storage surface having N horizontal sections, means for forming a storing beam for depositing a pattern on said surface in accordance with the picture information, synchronizing separator means supplied with the input television signals for deriving a signal of frequency H and a signal of frequency V, frequency dividing means supplied with said signal of frequency V for deriving a signal of frequency V/2, means supplied with said signals of frequency H and V/2 for deflecting the storing beam over said storage surface horizontally at a recurrent rate H and vertically at the recurrent rate V/2, means for forming a plurality of reading beams, each for reading a separate horizontal section for deriving an output signal therefrom, frequency dividing means supplied with the signal of frequency H for deriving a signal of frequency H/N, means supplied with said signal of frequency H/N and the signal of frequency V/2 for deflecting each of said reading beams over its associated section horizontally at a recurrent rate H/N and vertically at a recurrent rate V/2, a transmission path associated with each output signal, and means for transmitting said output signals over their associated paths.

2. A system for multichannel transmission of television signals comprising an arrangement according to claim 1 in combination with means for receiving the transmitted signals, a storage surface having N horizontal sections, means for forming N storing beams, one for storing on each horizontal section and depositing thereon a pattern in accordance with a corresponding transmitted signal, means for generating a signal of frequency H and a signal of frequency V, frequency dividing means supplied with the signal of frequency H for deriving a signal of frequency H/N, frequency dividing means supplied with said signal of frequency V for deriving a signal of frequency V/2, means supplied with signals of frequency H/N and V/2 for deflecting each storing beam horizontally at the recurrent rate H/N and vertically at the recurrent rate V/2, means for forming a reading beam for deriving an output signal by reading each section in turn, means supplied with said signal of frequency H and said signal of frequency V/2 for sweeping said storage surface horizontally at a recurrent rate H and vertically at a recurrent rate V/2, and utilization means for said output signal.

HERMAN A. AFFEL.
JOHN B. MAGGIO.

REFERENCES CITED

The following references are of record in the file of this patent:

UNITED STATES PATENTS

| Number | Name | Date |
|---|---|---|
| 2,191,565 | Henroteau | Feb. 27, 1940 |
| 2,275,224 | Henroteau | Mar. 3, 1942 |
| 2,277,516 | Henroteau | Mar. 24, 1942 |
| 2,367,277 | Henroteau | Jan. 16, 1945 |